No. 852,445. PATENTED MAY 7, 1907.
C. J. MELLIN.
REVERSING MECHANISM FOR LOCOMOTIVES.
APPLICATION FILED DEC. 5, 1906.
5 SHEETS—SHEET 5.
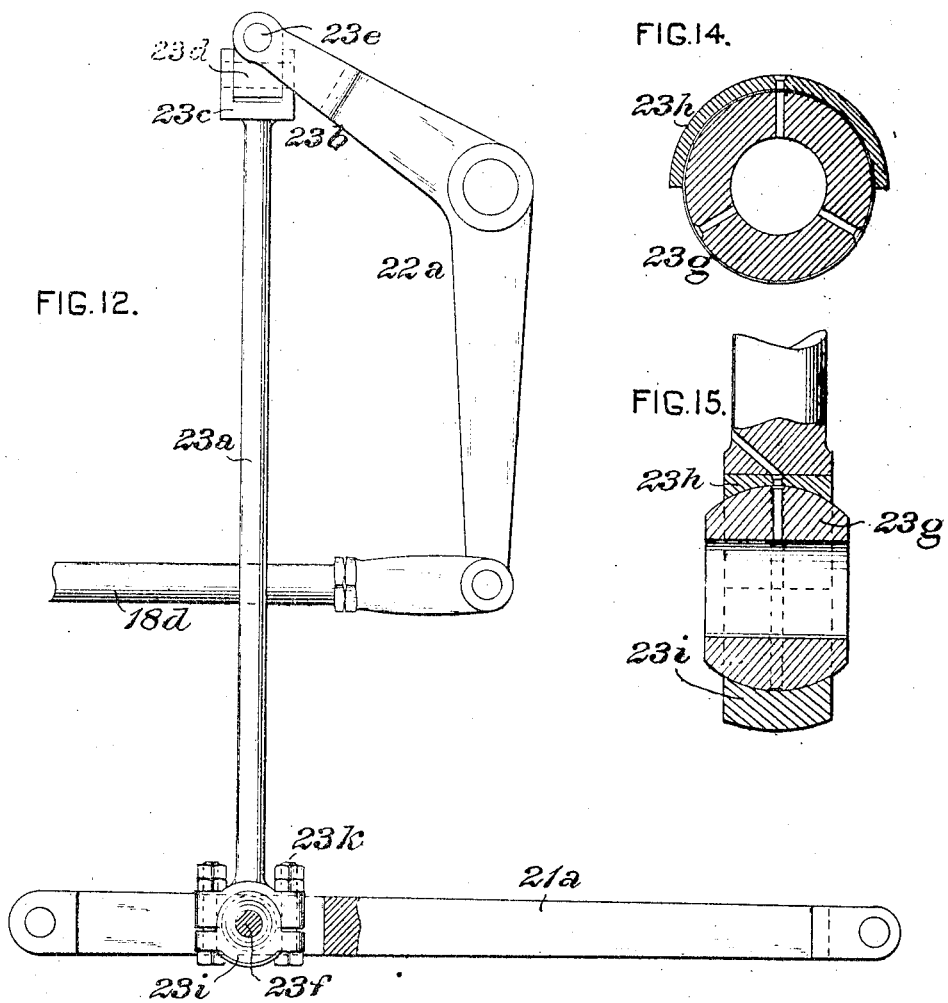
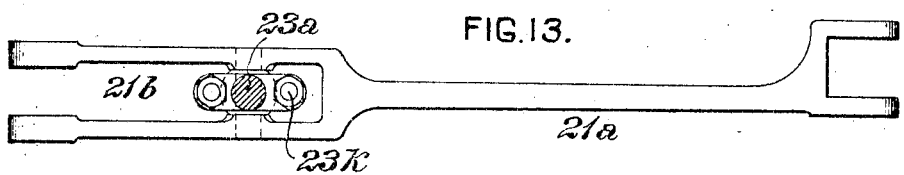
WITNESSES
James C. Herron
S. R. Bell
INVENTOR
Carl J. Mellin
by J. Snowden Bell,
Att'y.

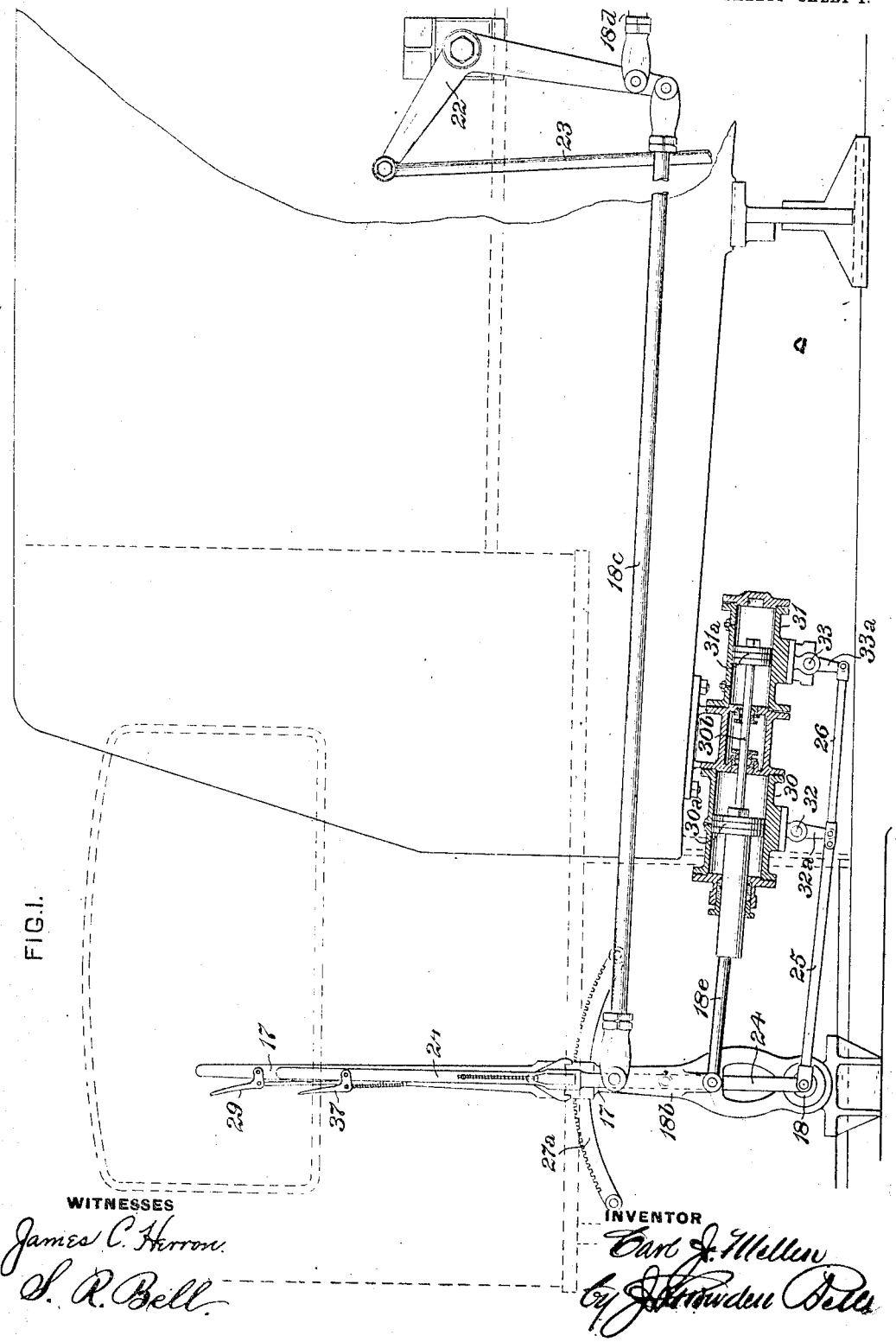

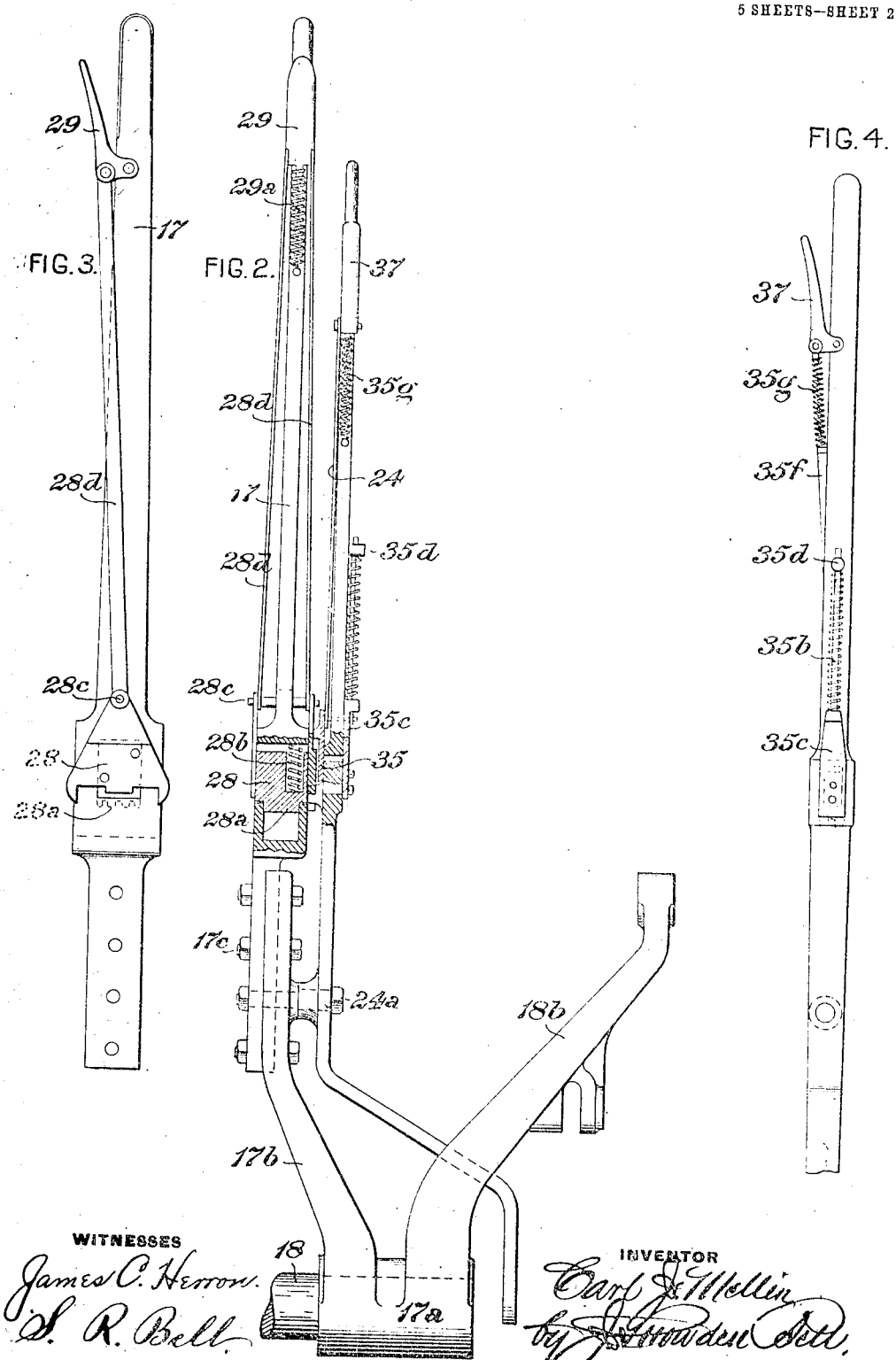

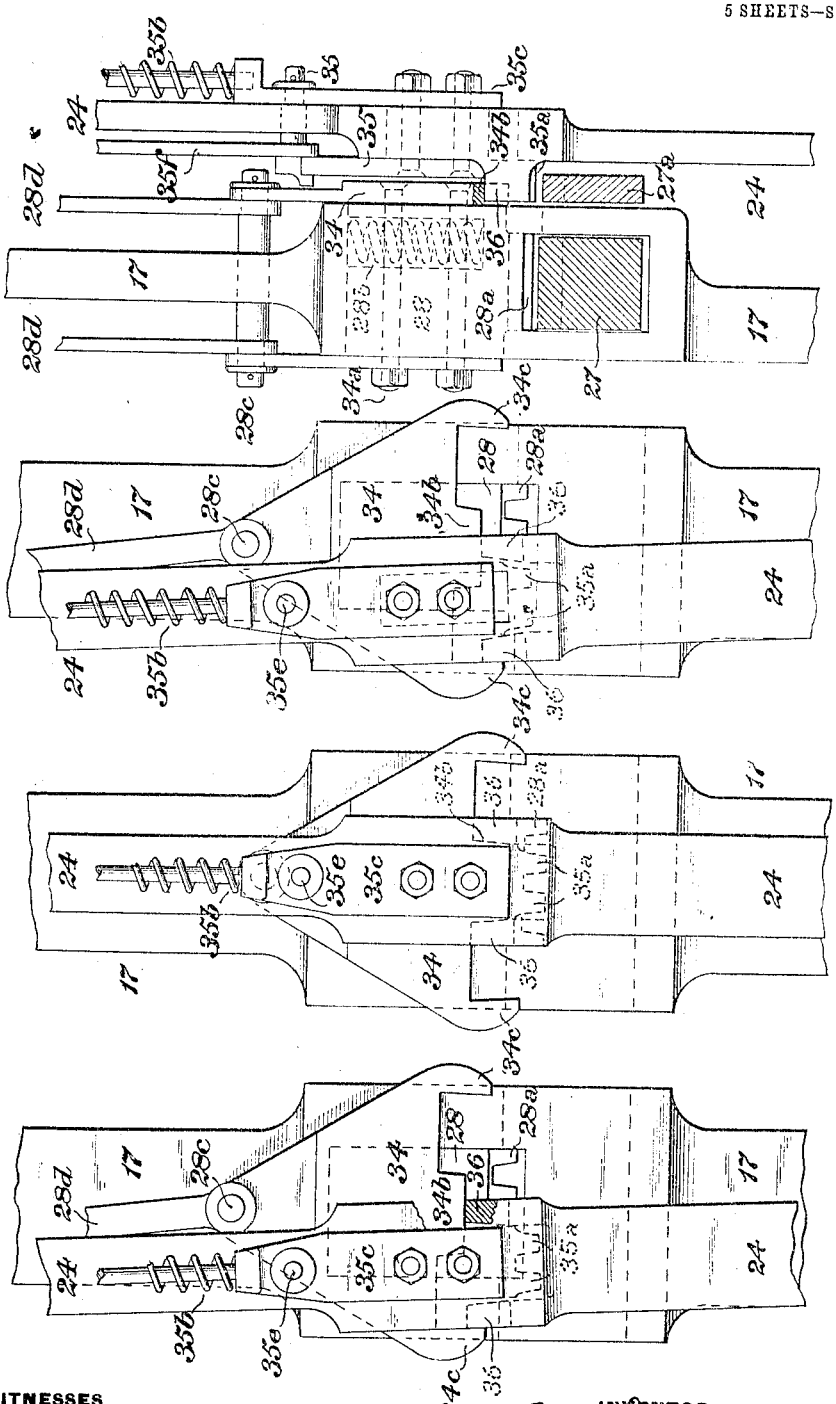

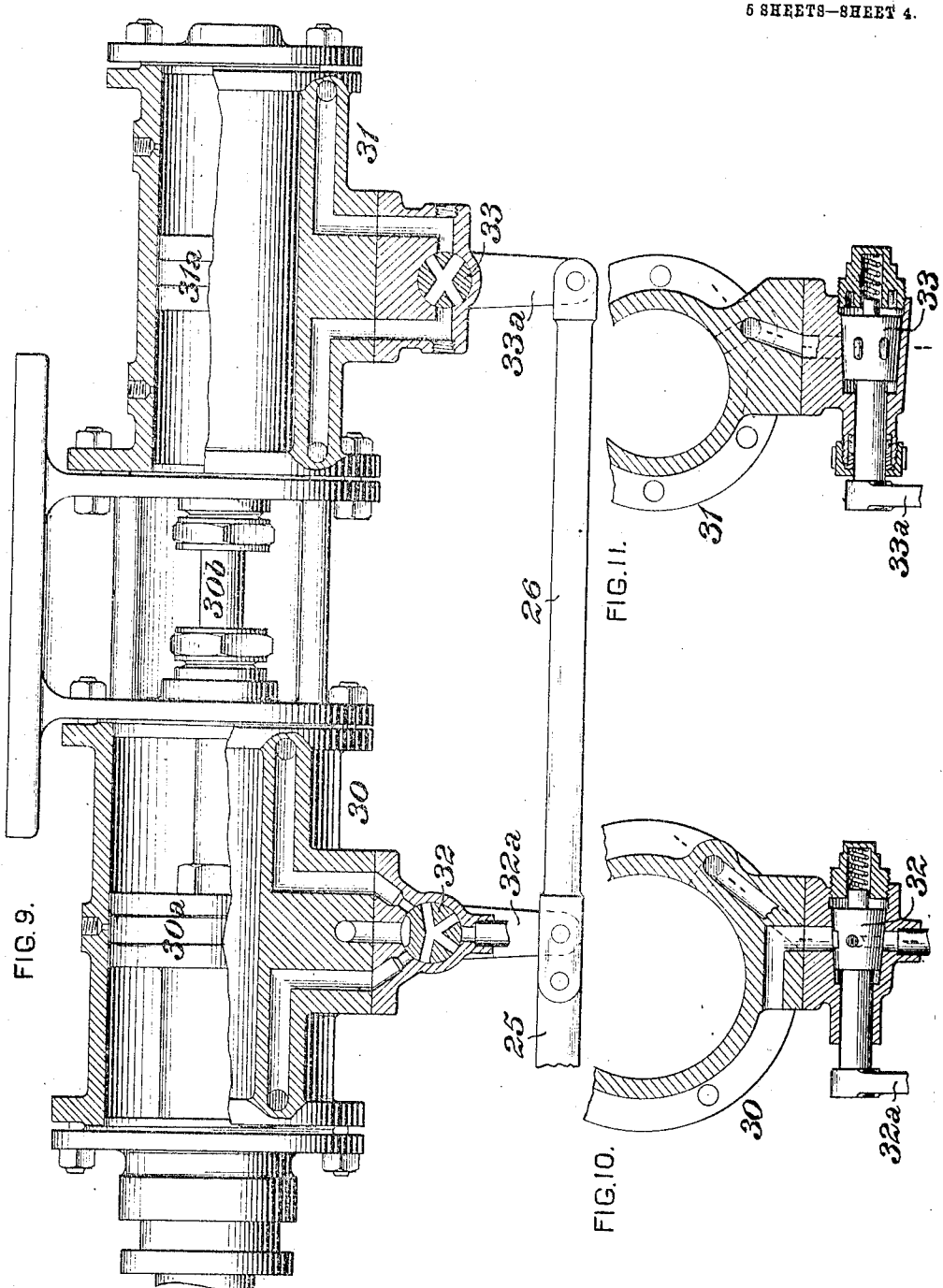

UNITED STATES PATENT OFFICE.

CARL J. MELLIN, OF SCHENECTADY, NEW YORK.

REVERSING MECHANISM FOR LOCOMOTIVES.

No. 852,445.

Specification of Letters Patent.

Patented May 7, 1907.

Application filed December 5, 1906. Serial No. 346,442.

*To all whom it may concern:*

Be it known that I, CARL J. MELLIN, of Schenectady, in the county of Schenectady and State of New York, have invented a certain new and useful Improvement in Reversing Mechanism for Locomotive and other Engines, of which improvement the following is a specification.

My invention relates to means for reversing the direction of movement of locomotive and other engines and varying the point of cut off therein, ordinarily known as reversing gears or reversing mechanisms, and its object is to provide a fluid pressure actuated mechanism of the above general type, which shall be capable also of being manually operated, if desired, in which the supply of operating fluid to the motor shall be effected by a manually actuated operating lever, and cut off either manually or automatically, in order to enable any valve actuating mechanism, or a plurality thereof, however heavy it or they may be, to be moved to the desired position for operation, by the engineer, applying the power of one hand only, and both the operating lever and the main lever through which the power of the motor is transmitted to the valve gear, to be locked, when moved to the desired position, both by engagement with fixed stops and by hydraulic pressure.

My invention is further designed to provide effective and convenient means for connecting the reversing mechanism with valve actuating mechanism mounted on a swiveling truck or bogie frame, in such manner that the transmission of movement to the valve actuating mechanism may be effected without disturbance or impairment by the lateral movement of the truck.

The improvement claimed is hereinafter fully set forth.

In the accompanying drawings: Figure 1 is a side view, partly in section, of a reversing mechanism illustrating an embodiment of my invention; Fig. 2, a rear view, partly in section, of the main reverse lever, the operating reverse lever, and the reversing arm; Fig. 3, a side view, in elevation, of the main reverse lever, detached; Fig. 4, a similar view of the operating reverse lever; Fig. 5, a side view, in elevation and on an enlarged scale, of portions of the main and the operating reverse levers, both being shown as latched or in locked position; Fig. 6, a similar view of the same, both levers being shown as unlatched or in unlocked position, and the operating reverse lever moved out of line with the main reverse lever; Fig. 7, a similar view of the same, the levers being in the same positions, but the main reverse lever being unlatched and the operating reverse lever latched; Fig. 8, a rear view, on the same scale, of portions of the main and the operating reverse levers, both levers being unlatched; Fig. 9, a view, partly in elevation and partly in longitudinal central section, of the motor and the locking cylinder; Fig. 10, a transverse section through the motor cylinder; Fig. 11, a similar section through the hydraulic pressure or locking cylinder; Fig. 12, a side view, in elevation, of the connections of the reversing mechanism with a valve actuating mechanism, illustrating the flexible joints thereof; Fig. 13, a transverse section through a lifting link and a plan view of a radius bar of the valve actuating mechanism, showing the universal joint connection thereof; Fig. 14, a transverse section, on an enlarged scale, through the ball joint of the lower end of the lifting link; and, Fig. 15, a longitudinal section through the same.

In the practice of my invention, I provide a main reverse lever, 17, which is fixed to a hub or boss, 17ª, journaled in bearings located in convenient proximity to the position occupied by the engineer when operating the engine, as, for example, on or under the foot plate of a locomotive engine. The particular manner of mounting the hub is not of the essence of my invention, it being only essential that it be journaled so as to be movable, with the connected main reverse lever, about its axial line, and this is, in practice, most conveniently effected by securing it upon a reversing shaft, 18, fitted to oscillate in bearings in the ordinary manner. For convenience of construction, the main reverse lever is preferably, as in the instance shown, made in a separate piece from the hub, and connected thereto, and to the reversing shaft, by being fitted in a recess in an arm, 17ᵇ, projecting from the hub, and secured therein by bolts, 17ᶜ. A reversing arm, 18ᵇ, is also fixed upon the reversing shaft, 18, preferably by being formed integral with the hub, 17ª, through which it is connected with the main reverse lever, 17, its movements about the axial line of the reversing shaft being thus caused to be coincident with those of the main reverse lever. The reversing arm, 18ᵇ, is connected by a reach rod, 18ᶜ, with one of the arms of a bell crank or double armed lifting lever, 22, which is journaled to oscillate about the axial line of a support at the junction of its arms, and is located in suitable relation to a valve actuating mechanism, and the other arm of said lever is connected, by a lifting link, 23, with the member of the valve mechanism which is to be moved in reversing or varying the point of cut off, as, for example, the radius bar of a Walschaert valve gear.

An operating reverse lever, 24, is pivoted, by a pin, 24ᵃ, to the main reverse lever, 17, so as to be either movable therewith in an arc about the axial line of the reversing shaft, or independently movable about the axial line of its pivot pin, 24ᵃ. The operating reverse lever, 24, extends downwardly below its pivot pin, and has an eye in its lower end normally concentric with the axis of movement of the main reverse lever, 17, to receive a pin by which it is coupled to a link, 25, for connection to the distribution valves of a motor and a hydraulic cylinder, as presently to be described. The main reverse lever, 17, is connected, through the reversing arm, 18ᵇ, and a link, 18ᶜ, coupled thereto, with the piston, 30ᵃ, of a fluid pressure motor, 30, fixed to a suitable support in a plane parallel with the plane in which the reverse levers traverse, and, as above described, is connected, through the reversing arm and the reach rod, 18ᶜ, with the valve actuating mechanism. Movement of the motor piston, 30ᵃ, in either direction, will, therefore, coincidently and correspondingly move the main reverse lever, 17, which, through its connections before described, will impart the movement to the member of the valve actuating mechanism which is required for reversing, or for varying the point of cut off. The operating reversing lever, 24, is coupled by links, 25 and 26, to an arm, 32ᵃ, on a three way distribution valve, 32, controlling the supply and exhaust of operating fluid under pressure to and from opposite sides of the motor piston, 30ᵃ, and to an arm, 33ᵃ, on a four way distribution valve, 33, controlling the traverse of substantially incompressible fluid, as oil, from one to the other side of a piston, 31ᵃ, working in a hydraulic pressure or locking cylinder, 31, in line axially with the motor cylinder, the piston, 31ᵃ, being fixed upon an extension of the piston rod, 30ᵇ, of the motor cylinder.

A quadrant, comprising, in the instance shown, two bars, 27, 27ᵃ, curved concentrically with the reversing shaft, 18, is fixed side by side at a suitable distance above said shaft, the quadrant bars being provided with a plurality of notches or recesses on their upper sides, which are engaged by teeth on spring latches connected to the main and operating levers, for the purpose of maintaining said levers in the different positions in which they may be adjusted in the operation of the engine, similarly to quadrants used in ordinary practice. Where, as in this instance, the main and operating reverse levers are set side by side, it becomes necessary to form the quadrant of two bars, one for each lever, but it will be obvious that if the portions of the main and operating reverse levers which extend above the bottom of the quadrant are disposed in the same vertical longitudinal plane, that is to say, set one in advance of the other, as, in some cases, is more convenient and desirable, the quadrant need have only a single bar.

A spring latch, 28, having, on its lower side, one or more teeth, 28ᵃ, adapted to engage the notches of the quadrant bar, 27, is fitted to traverse vertically in a transverse recess in the main reverse lever 17, and a spring, 28ᵇ, fitted in a lateral recess in the latch, acts, when unresisted, to force its teeth into engagement with the notches of the quadrant bar. The latch, 28, is coupled by a pin, 28ᶜ, to the lower ends of links, 28ᵈ, the upper ends of which are, in turn, coupled to a bell crank latch lever, 29, pivoted to the main reverse lever, 17, near its upper end. The movement of the latch lever in direction to withdraw the teeth of the latch from the notches of the quadrant, is opposed by a spring, 29ᵃ, connected at its opposite ends to the latch lever and to the main reverse lever, respectively. The pin, 28ᶜ, by which the latch, 28, is coupled to the links, 28ᵈ, also carries an interlocking plate, 34, which is connected by bolts, 34ᵃ, to the latch, 28, and is provided, on its lower side, with a central interlocking tooth, 34ᵇ, and end stops, 34ᶜ.

A spring latch, 35, having, on its lower side, one or more teeth, 35ᵃ, adapted to engage the notches of the quadrant bar, 27ᵃ, is fitted to traverse vertically on the operating reverse lever, 24, and a spring 35ᵇ, abuts against a plate, 35ᶜ, connected to the latch, 35, and against an abutment, 35ᵈ, fixed on the lever, 24, and acts, when unopposed, to force the teeth of the latch, 35, into engagement with the quadrant, 27ᵃ. The latch, 35, is coupled, by a pin 35ᵉ, to the lower end of a link, 35ᶠ, the upper end of which is, in turn, coupled to a bell crank latch lever, 37, pivoted to the operating reverse lever, 24, near its upper end. The movement of the latch lever in direction to withdraw the teeth of the latch from the notches of the quadrant, is opposed by a spring, 35ᵍ, connected, at its opposite ends, to the latch lever and to the operating reverse lever, respectively.

Two interlocking stops, 36, are fixed on the operating reverse lever, 24, on the side thereof adjoining the interlocking plate, 34, of the main reverse lever, 17, said stops projecting below the plate, 24, as shown in Fig. 8, and being spaced at such a distance apart as to permit the free vertical movement of the latch, 35, of the operating reverse lever between them in all positions of said lever, and to permit the interposition between them of the interlocking tooth, 34ᵇ, of the interlocking plate, 34, when, and only when, the main reverse lever and the operating reverse lever stand in line, as indicated in Fig. 5, in which position the two reverse levers are interlocked, and both may be latched or locked to, or both released from, the notches of the quadrant bars. In all other relative positions of the two reverse levers, the interlocking tooth, 34ᵇ, will stand above, and be prevented from downward movement by, one or the other of the interlocking stops, 36, as indicated in Figs. 6, 7, and 8, and, consequently, the interlocking plate cannot be lowered to permit the latching or locking of the main reverse lever to its quadrant bar until the operating lever is moved into line with the main reverse lever, or vice versa, as shown in Fig. 5, to their normal center lines, when the interlocking tooth, 34ᵇ, is free to pass down between the interlocking stop, 36, and the downward movement of the latch, 28, which is required for the locking of the main reverse lever, is thereby permitted.

In the operation of the reversing mechanism above described, when the engineer desires to reverse the direction of movement of the engine or to vary the point of cut off, he first unlatches the operating lever by pressing on the latch lever, 37, which raises the operating lever latch, which, in turn, raises the main lever latch by means of a shoulder under the tooth, 34ᵇ, and then moves the operating reverse lever, 24, in the appropriate direction, until one of its interlocking stops, 36, abuts against the adjacent end stop, 34ᶜ, of the interlocking plate of the main reverse lever. This movement of the operating reverse lever, through the links, 25 and 26, and their connections to the respective valves moves the distribution valve, 32, of the motor into position to admit motive fluid to the motor, 30, on the side of the piston thereof proper to move the main reverse lever and its connections in the desired direction, and moves the distribution valve, 33, of the hydraulic pressure cylinder, 31, into proper position to permit the traverse of fluid in said cylinder, from one side of its piston to the other. The motor thereupon, through the link, 18ᶜ, and reversing arm, 18ᵇ, moves the main reverse lever, 17, and its connections, in the desired direction for reversing, or for varying the point of cut off, as the case may be. The pressure of the engineer's hand on the latch lever, 29, of the main reverse lever, can be released as soon as the operating reverse lever is moved out of line with the main reverse lever, as such movement brings one of the interlocking stops, 36, underneath the interlocking tooth, 34ᵇ, on the plate 34, connected to the main reverse lever, and thereby prevents said lever from being locked or latched to its quadrant bar during its traverse. The movement of the two reverse levers, and their connections, continues until the main reverse lever has been brought to the desired position, when the engineer moves the operating reverse lever into alinement with the main reverse lever, as indicated in Fig. 5, and releases the pressure of his hand on the latch lever, 37, of the operating reverse lever. The interlocking tooth, 34ᵇ, is then, by the pressure of the springs, 28ᵇ and 29ᵃ, dropped into the space between the interlocking stops, 36, thereby interlocking the main and operating reverse levers, and the teeth of the latches of said levers are engaged with the notches of their respective quadrant. The movement of the operating reverse lever has previously actuated the distribution valves, 32 and 33, of the motor and hydraulic pressure cylinders, so as to cut off the supply of operating fluid from the motor and to automatically lock the piston thereof by preventing the passage of the fluid from one side of the connected piston of the hydraulic pressure cylinder to the other. The reversing mechanism is, in this manner, firmly locked in adjusted position, both by the mechanical engagement of the latch teeth with the quadrant and by the hydraulic pressure in the locking cylinder, 31. The position of the distribution valves, 32 and 33, remains unchanged during the traverse of the interlocked main and operating reverse levers, as the axis of the pin connecting the operating reverse lever, 24, and the link, 25, is substantially concentric with the axis of movement of the two levers.

In case it is desired to actuate the reversing mechanism by hand, as in the event of any failure or derangement of the motor, the latch, 35, of the operating reverse lever, is moved out of the notches of its quadrant bar, and held out of engagement therewith in any suitable manner, as by interposing a block between it and a shoulder on the latch of the main reverse lever, or by inserting a pin and block under its lower ends. The main reverse lever can then be moved by the application of both hands of the engineer, without interference by, or manipulation of, the operating reverse lever.

My invention is specially and desirably applicable in locomotives of the "articulated" type, having two pairs or sets of cylinders, provided with independent valve actuating mechanisms and located at the front and near the middle portion of the locomotive, respectively, the forward cylinders being mounted on a front frame, constituting a truck or bogie which is pivoted to, and has the capacity of swiveling movement relatively to, a rear frame on which the rear pair of cylinders and the reversing mechanism are mounted. In the application of the reversing mechanism above described to locomotives of this type, the reach rod, 18ᶜ, which connects the reversing arm, 18ᵇ, with the lifting lever, 22, of the valve actuating mechanism of the rear cylinders, is coupled, by a forward reach rod, 18ᵈ, to one of the arms of a bell crank or double armed lifting lever, 22ᵃ, substantially similar to the lifting lever, 22, and journaled in suitable relation to the valve actuating mechanism of the forward cylinders, to a member of which valve actuating mechanism, as a radius bar, 21ᵃ, it is connected by a lifting link, 23ᵃ.

In order to enable the movements required for reversing or varying the point of cut off to be imparted to the radius bar, 21ᵃ, without cramping or binding of the connections or other disturbance due to the swiveling movements of the front frame which carries the valve actuating mechanism of which the radius bar, 21ᵃ, is a member, the upper end of the lifting link, 23ᵃ, is coupled to the lifting lever, 22ᵃ, by a flexible joint which provides the capacity of movement in two directions, and the lower end of the lifting link is coupled to the radius bar, 21ᵃ, by a ball or universal joint, so as to admit of twisting under the lateral movements of the radius bar while being prevented by the upper joint from turning the lifting link so as to wear against the sides of the jaw of the radius bar. The joint at the upper end of the lifting link is preferably, as shown, formed by means of a block, 23ᵇ, which fits in a jaw, 23ᶜ, on the upper end of the lifting link, 23ᵃ; a pivot pin, 23ᵈ, coupling said block to the jaw; and a pivot pin, 23ᵉ, located at a right angle to the pin, 23ᵈ, and coupling the block to the lifting lever, 22ᵃ. The universal joint at the lower end of the lifting link is formed by means of a pin, 23ᶠ, which passes through the forks of a jaw, 21ᵇ, on the radius bar, 21ᵃ, and fits in a ball or spherical bearing, 23ᵍ, which is, in turn fitted between a seat, 23ʰ, and cap, 23ⁱ, each of which is correspondingly curved, the cap, bearing, and seat being connected to the lifting link by bolts, 23ᵏ. It will be seen that by the flexible joints thus provided, the connection between the lifting lever and radius bar, and the normal movement of the latter by the former, will be unaffected by the lateral movements of the front frame, and also that there will be no tendency to undue wear between the lifting link and the radius bar.

The features of the reversing mechanism herein set forth which are believed by me to be novel and patentable and of my invention, but which, under the classification of the Patent Office have been held not to be proper subject matter for claims herein, constitute the subject matter of a divisional application filed by me February 7, 1907, Ser. No. 356,165.

I claim as my invention and desire to secure by Letters Patent:

1. In a reversing mechanism, the combination of a main reverse lever journaled to move about a pivotal axis, means for connecting said lever to a valve actuating mechanism, a fluid pressure motor adapted to impart movement to the main reverse lever, an operating reverse lever pivotally connected to the main reverse lever, and means for supplying and exhausting motive fluid to and from the motor in and by the movements of the operating reverse lever about its pivotal axis on the main reverse lever.

2. In a reversing mechanism, the combination of a main reverse lever journaled to move about a pivotal axis, means for connecting said lever to a valve actuating mechanism, a fluid pressure motor adapted to impart movement to the main reverse lever, an operating reverse lever pivotally connected to the main reverse lever, means for supplying and exhausting motive fluid to and from the motor in and by the movements of the operating lever about its pivotal axis on the main reverse lever, and means, controlled by the movement of the operating reverse lever, for permitting or preventing, as desired, the locking of the main reverse lever in adjusted position.

3. In a reversing mechanism, the combination of a main reverse lever journaled to move about a pivotal axis, means for connecting said lever to a valve actuating mechanism, a fluid pressure motor adapted to impart movement to the main reverse lever, an operating reverse lever pivotally connected to the main reverse lever, means for supplying and exhausting motive fluid to and from the motor in and by the movements of the operating lever about its pivotal axis on the main reverse lever, and means, controlled by the movement of the operating reverse lever, for detachably interlocking said lever with the main reverse lever.

4. In a reversing mechanism, the combination of a main reverse lever, an operating reverse lever connected thereto with the capacity of independent movement thereon, a fluid pressure motor adapted to impart movement about a pivotal axis to the main reverse lever, a distribution valve controlling the fluid supply and exhaust of the motor, connections coupling the distribution valve with the operating reverse lever, and means for connecting the main reverse lever to a valve actuating mechanism.

5. In a reversing mechanism, the combination of a main reverse lever, an operating reverse lever connected thereto with the capacity of independent movement thereon, a fluid pressure motor adapted to impart movement about a pivotal axis to the main reverse lever, a hydraulic pressure cylinder having its piston connected to and movable with that of the motor, distribution valves controlling the fluid supply and exhaust of the motor and hydraulic pressure cylinder, connections coupling the distribution valves with the operating reverse lever, and means for connecting the main reverse lever to a valve actuating mechanism.

6. In a reversing mechanism, the combination of a main reverse lever, an operating reverse lever pivotally connected thereto, means for interlocking the main and operating reverse levers, a fluid pressure motor adapted to impart movement about a pivotal axis to the main reverse lever, a distribution valve controlling the fluid supply and exhaust of the motor, connections coupling the distribution valve with the operating reverse lever, and means for connecting the main reverse lever to a valve actuating mechanism.

7. In a reversing mechanism, the combination of a main reverse lever journaled to move about a pivotal axis, an operating reverse lever pivotally connected to the main reverse lever and having an eye on one of its ends substantially concentric with the axis thereof, a fluid pressure motor adapted to impart movement to the main reverse lever, a distribution valve controlling the fluid supply and exhaust of the motor, a link coupled to the eye of the operating reverse lever and to the distribution valve, and means for connecting the main reverse lever to a valve actuating mechanism.

8. In a reversing mechanism, the combination of a main reverse lever journaled to move about a pivotal axis, an operating reverse lever pivotally connected to the main reverse lever, a fixed quadrant provided with a plurality of notches or recesses, spring latches connected to the main and operating reverse levers and carrying teeth adapted to engage the quadrant notches, means for interlocking the main and operating reverse levers to permit the locking of the main reverse lever to the quadrant when the two levers are in alinement and prevent such locking when out of alinement, a fluid pressure motor adapted to impart movement to the main reverse lever, a distribution valve controlling the fluid supply and exhaust of the motor, connections coupling the distribution valve with the operating reverse lever, and means for connecting the main reverse lever to a valve actuating mechanism.

9. In a reversing mechanism, the combination of a main reverse lever journaled to move about a pivotal axis, means for connecting said lever to a valve actuating mechanism, a fluid pressure motor adapted to impart movement to the main reverse lever, an operating reverse lever journaled to move about a pivotal axis, means for mechanically connecting the main and operating reverse levers, and means for supplying and exhausting motive fluid to and from the motor in and by the movements of the operating reverse lever about its pivotal axis.

CARL J. MELLIN.

Witnesses:
J. SNOWDEN BELL,
GEORGE H. SONNEBORN.